US008620471B2

(12) United States Patent
Turrini

(10) Patent No.: US 8,620,471 B2
(45) Date of Patent: Dec. 31, 2013

(54) METHOD FOR CONTROLLING A MACHINE TOOL

(75) Inventor: Andrea Turrini, Bologna (IT)

(73) Assignee: Marposs Societa' per Azioni, Bentivoglio (bo) (IT)

( * ) Notice: Subject to any disclaimer, the term of this patent is extended or adjusted under 35 U.S.C. 154(b) by 350 days.

(21) Appl. No.: 12/744,466

(22) PCT Filed: Dec. 16, 2008

(86) PCT No.: PCT/EP2008/067601
§ 371 (c)(1),
(2), (4) Date: May 24, 2010

(87) PCT Pub. No.: WO2009/080606
PCT Pub. Date: Jul. 2, 2009

(65) Prior Publication Data
US 2010/0256799 A1 Oct. 7, 2010

(30) Foreign Application Priority Data

Dec. 20, 2007 (IT) .............................. BO2007A0836

(51) Int. Cl.
*G05B 19/401* (2006.01)
(52) U.S. Cl.
USPC ............. 700/186; 700/195; 700/194; 700/66; 702/168; 73/1.81; 439/488
(58) Field of Classification Search
USPC ................... 700/195, 186, 194, 66; 702/168; 73/1.81; 439/488
See application file for complete search history.

(56) References Cited

U.S. PATENT DOCUMENTS

| 4,693,110 A | 9/1987 | Juengel |
| 6,115,647 A | 9/2000 | Carli et al. |
| 6,708,385 B1* | 3/2004 | Lemelson ..................... 29/563 |
| 2004/0185706 A1* | 9/2004 | Price et al. ................... 439/488 |
| 2006/0173651 A1 | 8/2006 | Ferrari et al. |
| 2006/0232791 A1 | 10/2006 | Turrini |

FOREIGN PATENT DOCUMENTS

| JP | 63-040910 | 2/1988 |
| JP | 10-232704 A | 9/1998 |
| JP | 2007-279905 | 10/2007 |
| WO | WO 03/002296 A1 | 1/2003 |

* cited by examiner

*Primary Examiner* — Tejal Gami
(74) *Attorney, Agent, or Firm* — Dickstein Shapiro LLP

(57) ABSTRACT

A system for controlling a numerical control machine tool with movable component parts carrying tools (5) and/or mechanical component parts to be checked includes a control unit (7) and a sensor device (9) having an associated interface unit (15). A digital channel (20), through which there are transmitted measuring signals from the interface unit to the control unit, is used, at different moments and as an alternative to the measuring process, for transmitting confirmation pulse signals (ACK) consequent to request/instruction messages that the control unit sends to the interface unit. A method for controlling the machine tool includes the sending of request/instruction messages (M) from the control unit to the interface unit, for example for checking the efficiency and the operativeness of the measuring chain, and the reception of confirmation pulse signals through the transmission channel which is a component part of the measuring chain. The sensor device is advantageously implemented by means of an optoelectronic apparatus which detects the interruption of the light beam (10), typically a laser beam.

6 Claims, 4 Drawing Sheets

METHOD FOR CONTROLLING A MACHINE TOOL

TECHNICAL FIELD

The present invention relates to a system for controlling a numerical control machine tool including a control unit, a sensor device adapted to cooperate with a mechanical part and to provide measuring signals relating to the mutual position between the sensor device and the mechanical part, an interface unit electrically connected to the sensor device and to the control unit, and a digital channel for electrical connection between the interface unit and the control unit.

The present invention also relates to a method for controlling a numerical control machine tool, with a sensor device, a control unit, an interface unit electrically connected to the sensor device and to the control unit, and a digital channel for electrical connection between the interface unit and the control unit, the control unit being adapted to run the performance of a measuring instruction and to detect a digital measuring signal consequently received within a determined time interval through said digital channel for electrical connection.

BACKGROUND ART

It is known that the numerical control ("NC") of a machine tool, for example a machining center, enables to carry out automatic machining operations of a mechanical piece by controlling mutual displacements between the tool and the piece with very high accuracy. The control is carried out by means of suitable instructions, on the basis of previously acquired numerical data.

It is also known to use sensor devices such as checking or measuring units to detect the dimensions or the position of the mechanical piece being machined and/or of the utilised tool or other component parts of the machine, and to provide associated signals to the numerical control. The numerical control employs new data obtained on the basis of said signals in order to enhance the controls and the piece machining.

Even the intervention of the sensor devices is controlled by the NC in an automatic or manual way by means of suitable instructions. For instance, in the numerical control there is available a measuring instruction using a digital signal (trigger) produced by the external sensor device. This measuring instruction generally requires a displacement between component parts of the machine and the sensor, and "photographs" the positions of the machine axes (detected by suitable devices) under the control of the sensor device. The displacement ends if the sensor signal is received or, in case of non-reception of the latter, if the movable component parts reach a borderline safety position.

The sensor device can be for example a touch probe or an optoelectronic device ("laser probe") including a light beam transmitter and a light beam receiver and means for signalling the interruption of said beam. In both cases, there is included an interface unit for sending the trigger signals to the NC through a measuring channel, which is generally defined by a connection cable.

Sometimes, a second cable couples the sensor device or the associated interface unit to the NC for sending a signal indicative of the correct operation of the sensor device. For instance, in the event a "laser probe" is employed, the signal indicates that the light beam correctly reaches the receiver.

A problem of the known apparatus is related to the possibility of checking the correct operation of the sensor device in a very reliable way in order to avoid wrong signalling and dangerous uncontrolled displacements of the component parts of the machine tool.

In fact, a second physical input in the NC for the previously mentioned second connection cable is not always available. Moreover, even when the second connection is available, the possibility that a failure, for example in the interface or in the second connection, causes a wrong positive signalling is not negligible. Finally, the checking is in any case partial, since the condition of the measuring channel, which could be interrupted or in short circuit with others conductors, is not taken into consideration.

DISCLOSURE OF THE INVENTION

Object of the present invention is to provide a system and a method for controlling a numerical control machine tool that overcome the problems of the known systems and enable simple, reliable and adaptable checking processes with regard to the performance of the sensor devices connected to the NC, and, more generally, a simple and adaptable information transmission from the sensor device to the numerical control.

This and other objects are achieved by a control system according to claim 1 and by a control method according to claim 12.

A control system according to the present invention includes a control unit and a sensor device for cooperating with a mechanical part, such as a tool or a piece which has been machined or has to be machined. The sensor device, for example an optoelectronic apparatus detecting the interruption of the light beam, typically a laser beam, provides measuring signals relating to the mutual position between the sensor device and the mechanical part to an interface unit, which is electrically connected to the control unit through a digital channel for electrical connection. The interface unit includes selection means adapted to selectively enable the transmission of the measuring signals and of confirmation signals through the digital connection channel. The interface unit includes a processing unit, such as a microprocessor, for controlling the selective enabling processes of the different signals by the enabling means, and the generation and transmission of the confirmation signals. Such selective enabling processes are controlled by messages that are transmitted from the control unit to the interface unit through a generic communication channel which could be, for example, of the one-way serial type. The interface unit can be integrated in the sensor device.

In a control method according to the present invention—with a control unit which controls the performance of a measuring instruction and detects a digital measuring signal which is consequently received within a determined time interval through the electrical connection channel—the control unit transmits a message to the interface unit through a communication channel, for instance a sequence of digital signals or a one-way serial connection, and controls a measuring instruction. The interface unit which receives such message performs operations depending on the contents of the latter, for example it can perform an operativeness verification and/or get ready for implementing a particular measuring strategy, and generates and transmits a digital confirmation signal through the electrical connection channel. The control unit detects the reception of the digital confirmation signal within the previously mentioned determined time interval.

A control method according to the present invention can relate, for example, to the checking of the correct operativeness of the measuring chain including the sensor device and the means for transmitting the associated signals to the control unit. In the event the sensor device is an optoelectronic apparatus including a light beam and associated emitter and receiver, such checking can be carried out by generating a suitable sequence of power on and switch off controls of the emitter, and the concurrent observation of the receiver state. The performance of the measuring instruction can involve mutual displacements between the sensor device and a component part of the machine tool, for example a tool fixed to an associated spindle.

BRIEF DESCRIPTION OF THE DRAWINGS

The invention is now described with reference to the enclosed sheets of drawings, given by way of non limiting example, wherein.

BEST MODE FOR CARRYING OUT THE INVENTION

Figure 1:
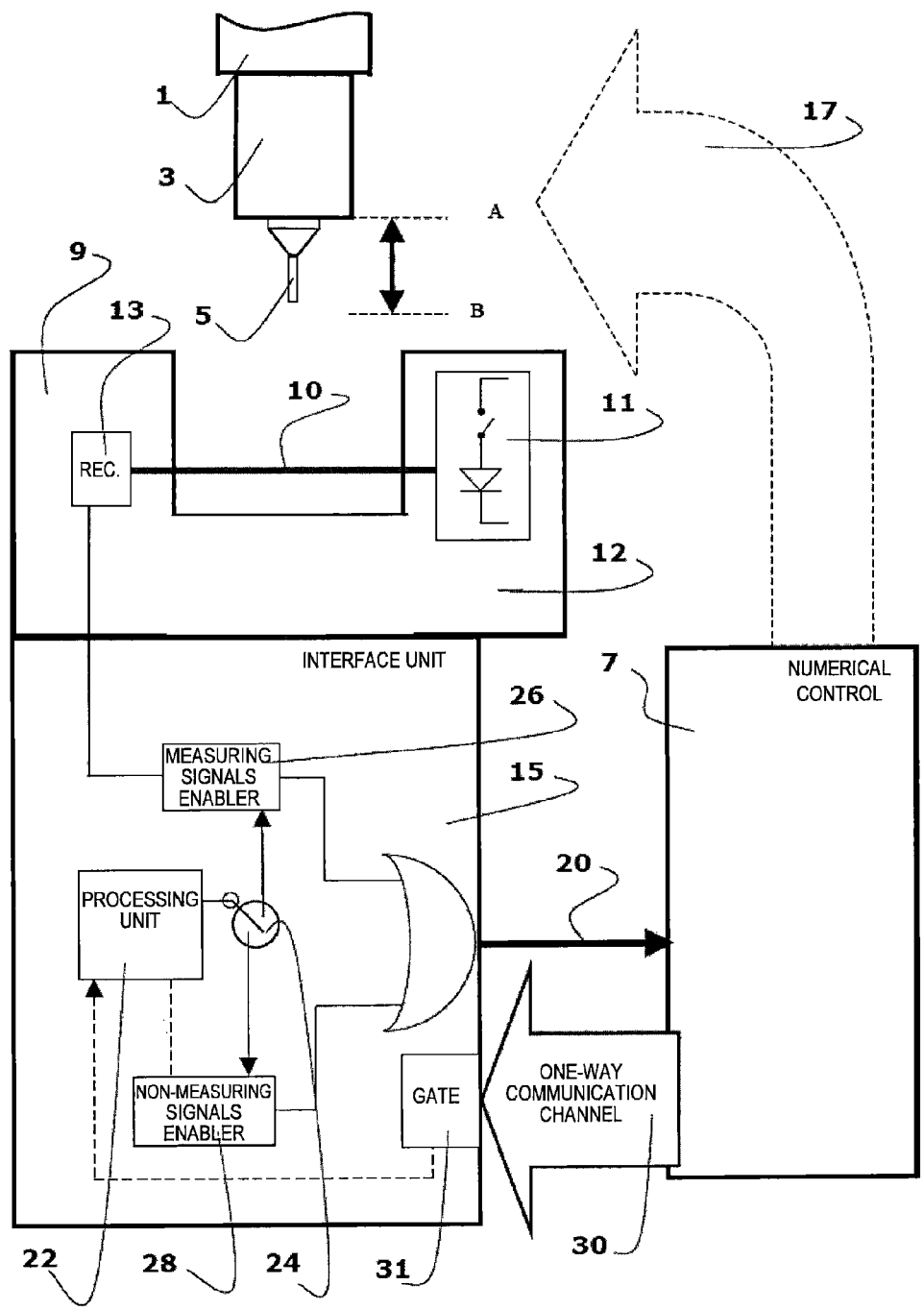
FIG. 1 is a block diagram of a control system of a numerical control machine tool according to the present invention.

As schematically illustrated in FIG. 1, a machine tool 1 includes a tool-holder, for example a spindle 3 carrying a tool 5. The numerical control ("NC") 7 of the machine tool manages (arrow 17) displacements of the spindle 3, such as axial rotations and translations.

A sensor device 9 is for example an optoelectronic apparatus including a "laser probe", with an emitter 11 and a receiver 13 of a light beam 10, for example a laser beam, and means for detecting the interruption of the beam 10. The optoelectronic apparatus can include either a support frame 12 which, as schematically shown in FIG. 1, carries both the emitter 11 and the receiver 13, or distinct elements including the emitter 11 and the receiver 13, respectively, according to an embodiment which is per se known and thus herein not illustrated in detail.

An interface unit 15 is electrically connected to the sensor device 9, in particular to the receiver 13. The interface unit 15 can be either physically integrated in the casing of the sensor device 9, or spaced apart and connected, for example, through an electrical cable.

A digital channel 20 for electrical connection is preferably implemented by means of a cable which joins the interface unit 15 to the control unit 7, and enables the transmission to the control unit 7 of a digital measuring signal consequent to the interruption of the light beam 10. As an alternative to the cable, for example the digital channel 20 can be implemented with a wireless transmission system of a known type. Displacements of the spindle 3 with respect to a mechanical piece to be machined (not visible in the diagram of FIG. 1) or with respect to the sensor device 9 for checking the dimensions or the integrity of the tool 5, are controlled and checked by the NC 7. In particular, measuring instructions of a known type are used for checking the integrity of the tool 5, or for measuring the dimensions thereof. A measuring instruction causes a displacement of the spindle 3 towards the sensor device 9, and the interruption of the beam 10 is detected and then transmitted to the control unit 7 through the digital channel 20. If, further to a measuring instruction, the displacement of the spindle 3 continues for a determined elapse of time and no interruption of the beam 10 is detected, such displacement is stopped at a borderline safety position.

The interface unit 15 includes a processing unit 22, including for example a microprocessor, or a microcontroller, or a programmable logic device which includes a suitable processing software. The processing unit 22 checks, among other things, selection means, schematically indicated in FIG. 1 with the reference number 24, which alternatively enable the transmission through the digital channel 20 of measuring pulse signals (situation shown in simplified form in FIG. 1 wherein the block 26 is connected to the receiver 13) and of pulse signals of other nature (situation shown in simplified form in FIG. 1 wherein the block 28 is functionally connected to the processing unit 22), for example confirmation signals as it will be hereinafter illustrated.

A one-way communication channel, which is represented in simplified way in FIG. 1 by an arrow and indicated with the reference number 30, and includes for example a serial connection or a group of digital signals 0-24 V, enables the transmission of messages from the control unit 7 to the interface unit 15, in particular to a gate 31 functionally connected to the processing unit 22.

Figure 2A:
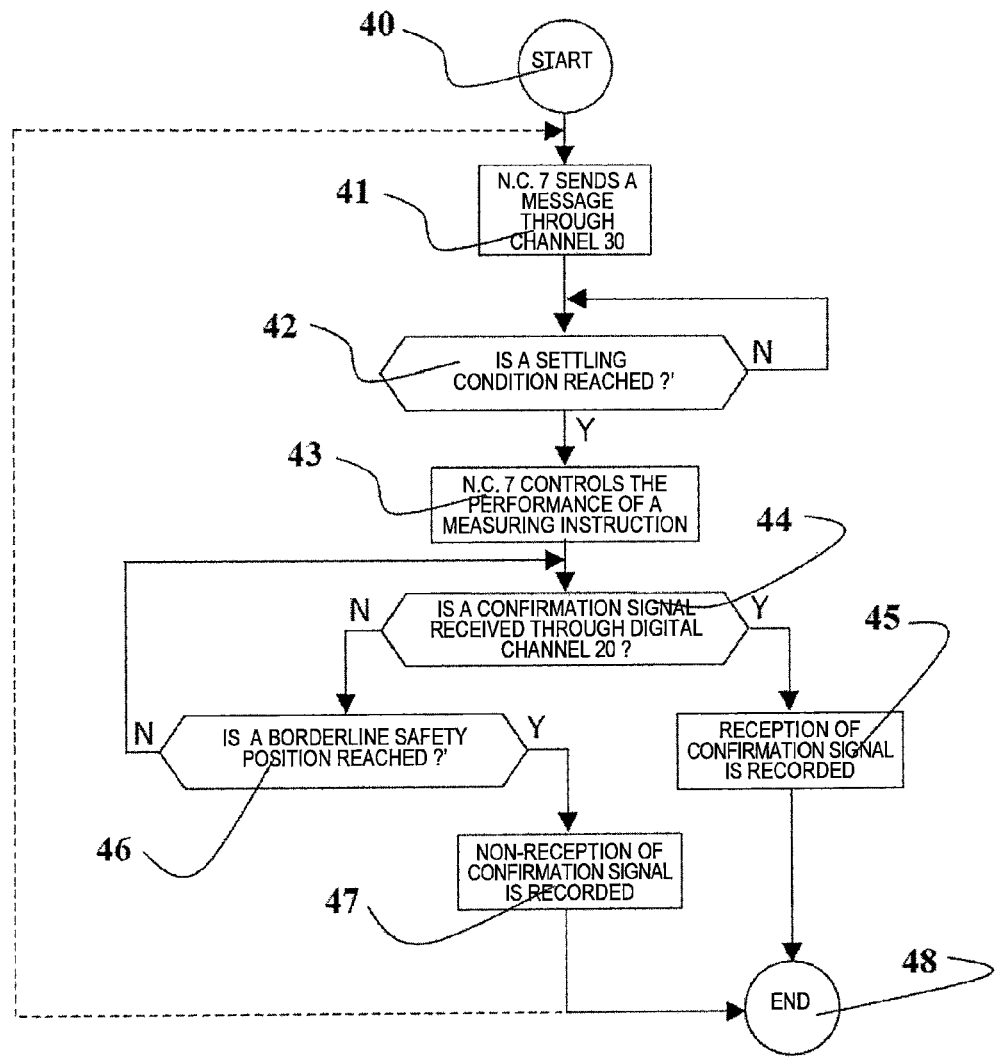
FIGS. 2a and 2b are flow charts of a control method according to the present invention.
Figure 2B:
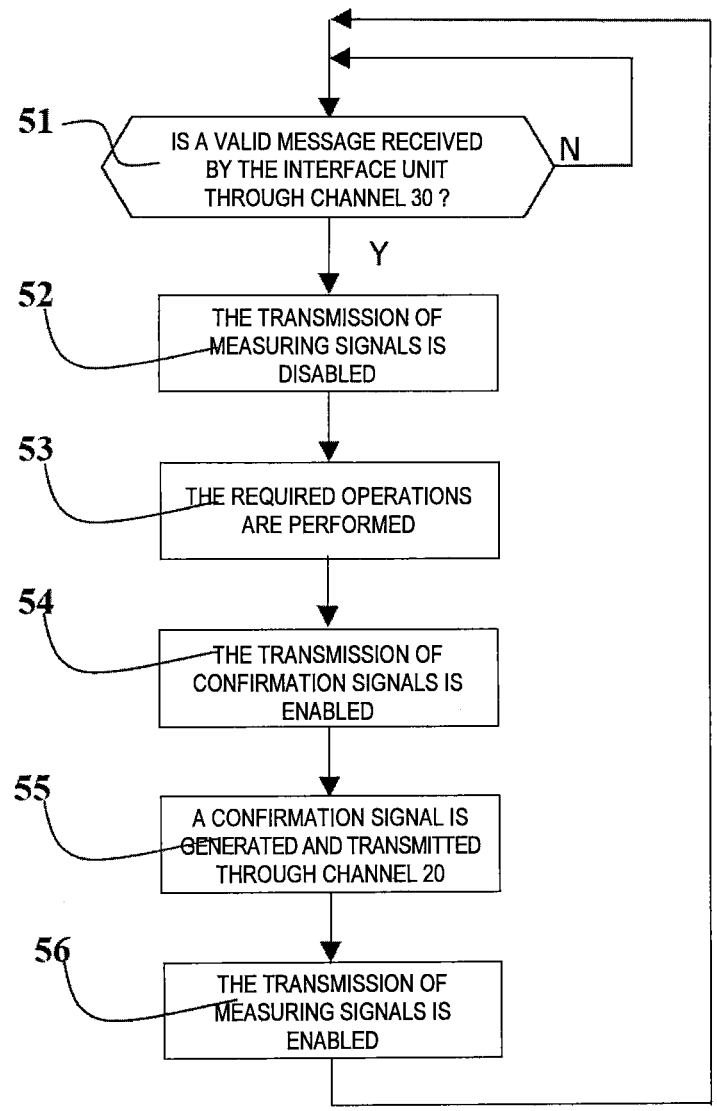

A method according to the present invention is herein described making reference to the flow charts of the FIGS. 2a and 2b concerning the control unit 7 and the interface unit 15, respectively. In particular, the described method relates to a new way of managing the pulse signals transmitted from the interface unit 15 to the control unit 7, that is additional to the detecting of measuring signals which is per se known and previously mentioned.

The blocks of the flow chart of FIGS. 2a and 2b have the following meaning:

block 40—start of the procedure performed by the control unit 7;
block 41—sending of a message from the control unit 7 through the one-way channel 30;
block 42—test relating to the completion of a settling time period;
block 43—performance of a measuring instruction;
block 44—test relating to the reception of a pulse signal;
block 45—the reception of a response signal is recorded;
block 46—test relating to the achieving of a borderline safety limit;
block 47—the non-reception of a response signal is recorded;
block 48—end of the procedure performed by the control unit 7;
block 51—test relating to the reception of a valid message through the one-way channel 30 and the gate 31;
block 52—the transmission of measuring pulse signals through the digital channel 20 is disabled;
block 53—performance of possible operations required by the received signal;
block 54—the transmission, through the digital channel 20, of pulse signals in response to the received signal is enabled;
block 55—a pulse signal (or "skip") is generated and transmitted through the digital channel 20;
block 56—the transmission of measuring pulse signals through the digital channel 20 is enabled again.

In a method according to the present invention, a message is sent from the control unit 7 through the one-way channel (block 41). The message can include, for instance:
(a) a request for verifying the efficiency and the operativeness of the measuring chain including the sensor device 9,
(b) a request for actuating a particular strategy of using the sensor device 9 (for instance, in the case of using a laser probe, such strategy can substantially consist in measuring the length of the tool 5, or verifying the integrity of the tool 5, or verifying the presence of eccentricity or "run out", etc.), (c) the transmission of auxiliary measuring parameters
(for instance, features of the tool 5, such as rotation speed and number of cutting edges; intensity of the laser beam 10, etc.), (d) a request about the result of a verification (for instance, the tool 5 is integral/damaged, or the tool is correctly mounted, or the tool is suffering from "run out", etc.).

Once, if necessary, a determined time period has elapsed for avoiding "critical strokes", i.e. a time period that is sufficient to assure that the control unit 7 and the interface unit 15 have reached a settling condition (block 42), the control unit 7 sends a measuring instruction (block 43) causing a consequent displacement of the spindle 3 in a path of prefixed length. In FIG. 1, the letters A and B schematically indicate the limit positions of said path, wherein B represents a borderline safety position. As it is hereinafter disclosed, the measuring instruction will end owing to the reception of the confirmation pulse signal or, in the case of non-reception of the latter, owing to the reaching of the borderline safety position B, after the elapsing of a determined time interval.

In the event a valid message is received by the interface unit 15 (block 51), and reaches the processing unit 22 through the gate 31, the transmission of measuring pulse signals through the digital channel 20 is disabled (block 52) by means of the selection means 24. It is pointed out that, in the example of FIG. 1 including the laser probe 9, said measuring pulse signals are responsive to the interruption of the light beam 10. Possible operations that are required by the received message—such as, as previously mentioned, the verification of the operativeness of the laser probe 9 or the actuation of a particular measuring strategy—are performed under the control of the processing means 22 (block 53). Once the transmission through the digital channel 20 has been enabled (selection means 24, block 54), a confirmation pulse signal in response to such message is generated and transmitted, still under the control of the processing means 22 (block 55). The meaning of the response provided to the NC 7 through the pulse signal varies case by case. Making reference to the previously mentioned examples of message, such meaning is the following one:

(a) positive result of the verification concerning the efficiency and operativeness of the measuring chain;
(b) request has been received;
(c) parameters have been received;
(d) positive result of the required verification (for example, the tool 5 is integral, or correctly mounted, or not suffering from "run-out").

After the sending of the confirmation pulse signal, the processing unit 22 arranges to disable, by the selection means 24, the transmission of other confirmation signals and to enable the transmission of measuring pulse signals (block 56) again, awaiting for possible new messages for the NC 7.

Figures 3A, 3B:
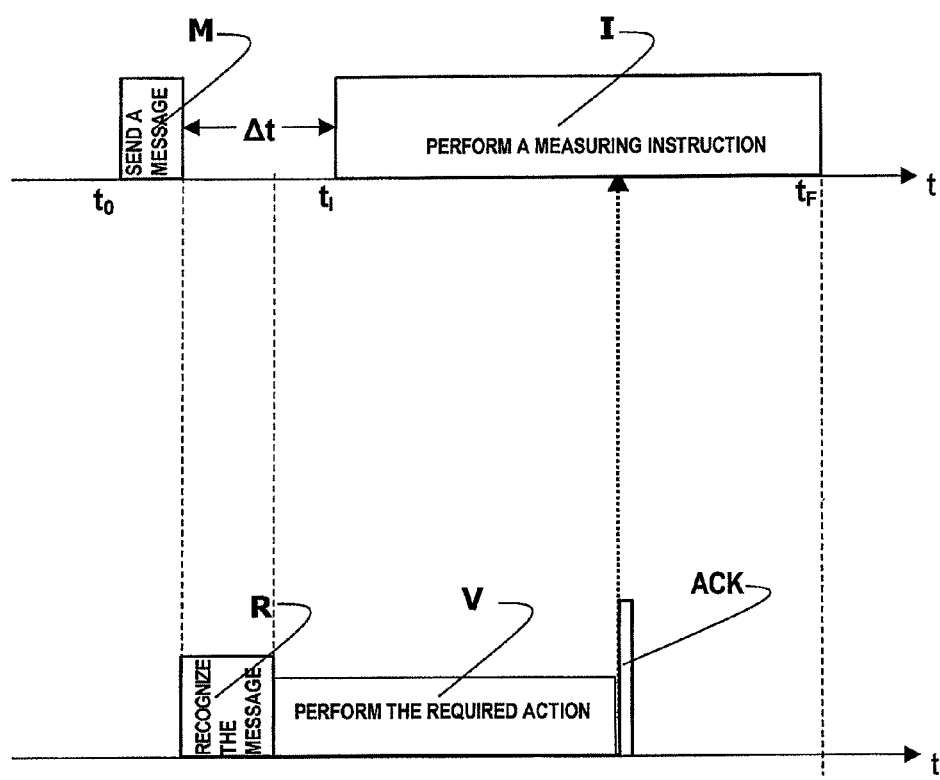
FIGS. 3a and 3b are graphical illustrations of some steps of the method of FIGS. 2a and 2b.

After the sending of the measuring instruction as previously disclosed, the numerical control 7 checks whether the confirmation signal is received (block 44) through the digital channel 20, or the borderline safety position B is reached (block 46) after the elapsing of a determined time interval, without the reception of any signal. In the former and latter cases, there is recorded the reception of the confirmation signal (block 45) or the non-reception of the latter (block 47). In the latter case, a message could be sent again (dashed line of FIG. 2a). In brief, with reference to the graphical representations of FIGS. 3a and 3b referring to actions of the NC 7 and actions of the interface unit 15, respectively, the NC 7 sends, at an instant $t_0$, a message M including requests and/or instructions to the interface unit 15 and, after elapsing of a short time interval $\Delta t$, sends a measuring instruction I. If the interface unit 15 does not recognise the message and thus ignores it, the measuring instruction ends after the elapsing of the time interval $t_F$-$t_I$ when the borderline safety position B is reached. On the contrary, if the message is recognised (FIG. 3b, reference R), the action V required by the NC 7 is performed, and consistently with the latter, suitable "information" is sent by means of a confirmation signal ACK through the digital channel 20. Preferably, the confirmation signal ACK consists of a pulse having suitable duration which ensures a better protection against wrong signalling due to connection interruptions or short circuits, with respect to an alternative solution including a static signal level.

The use of a system and a method according to the present invention provides various advantages with respect to the known systems and methods, among which an increasing of the functions that can be obtained from the sensor device/interface unit assembly thanks to the availability of a protocol employing a base resource such as the physical measuring channel, a considerable simplification of the applications, because the number of auxiliary connection signals which is necessary to foresee between the NC and the interface unit is decreased, the possibility of checking the operation of the whole measuring chain in an exhaustive and reliable way. Among other things, in this way the probability that collisions occur in the machine tool during the measuring procedures is decreased, for instance by using the laser probe.

In particular, a method for checking the efficiency and the operativeness of the measuring chain according to the present invention can include some specific steps that can be identified in the flow charts of FIGS. 2a and 2b, as hereinafter disclosed.

In an initialization phase (block 40) the NC controls a displacement of the spindle 3 carrying the tool 5 to such a position A that, during the subsequent measuring movement towards the borderline position B, the tool 5 or other movable component parts of the machine do not interfere with the light beam 10 in a continuos way. The diagram of FIG. 1 makes reference to this situation.

Then, the NC 7 transmits—if necessary even more than once a message (block 41) including the request of "verification of the efficiency of the measuring chain". When the interface unit 15 receives a valid message (block 51), goes on with the checking operations that are controlled by the processing unit 22 (block 53) and consist, for example, of the generation of a suitable sequence of power on and switch off controls of the emitter 11, and of the concurrent observation of the state of the receiver 13.

If the verification corresponding to the block 53 has a positive result (and only in this case), the transmission (block 54) is enabled by means of the selection means 24, and the processing unit 22 (block 55) causes the generation and transmission of a confirmation pulse signal ACK, through the digital channel 20.

After the transmission of the message, the NC 7 waits (block 42) for a time period that is necessary for enabling the interface unit 15/sensor device 9 assembly to perform the above mentioned efficiency verifications and to send the possible confirmation signal ACK, and sends the measuring instruction (block 43). Then, the NC 7 awaits for the confirmation signal ACK (block 44) or for the reaching, after the elapsing of the time interval $t_F$-$t_I$, of the borderline position B (block 46).

In this way, the NC 7 receives the confirmation signal ACK only if the whole measuring chain (emitter 11, receiver 13, interface unit 15, connection cables implementing the digital channel 20, component parts and software of the NC 7) correctly operates. For this purpose, the choice of moving the tool 5 between the positions A and B that do not interfere with the light beam 10 in the performing of the measuring instruction ensures that the checking operations described with reference to the block 53 be correct.

The information concerning the correct operation is transmitted by means of the channel 20 which is the same channel as the one transmitting the measuring signal. On the contrary, in some known systems, this kind of information is transmitted by means of a further communication channel which can be subjected to malfunctions other than those relating to the measuring chain and, due to such malfunctions, could transmit false response, thus causing negative consequences.

Even thought the example of FIG. 1 shows a laser probe, a system and a method according to the present invention can include and concern sensor devices of different type, for example a touch trigger probe or touch probe which, further to displacements of component parts of the machine tool that are controlled by the NC 7, touches the surface of a part to be checked (tool or piece which has been machined or has to be machined), and, further to the deflection of a movable arm, transmits associated signals.

A method according to the present invention for checking the efficiency and the operativeness of a measuring chain including a touch probe enables to obtain excellent results, even though this verification can not be so complete as those carried out in cases including the laser probe. In fact, whereas in the case shown in the drawings and described above the interface unit can simulate the interference between the sensor device and the mechanical part in an autonomous way, i.e. it can interrupt the light beam 10 by switching off the emitter 11, it is not possible to simulate the contact between the mechanical part and the touch probe in a similar way, i.e. to deflect the movable arm in an autonomous way.

An other application example wherein a method according to the present invention can be advantageously used concerns the possibility for the control unit 7 to directly manage some resources relating to the interface unit 15, without employing dedicated logic units such as "PLC". For instance, the control unit 7 can control the feed displacement or the retraction displacement of a hydraulic slide carrying the laser probe 9, and recognise when the slide reaches the end stop positions at the end of its stroke.

To do so, an application program is run in the NC 7. Through the one-way serial channel 30, this program first sends a message requiring the feed movement of the slide, and performs a displacement/measuring instruction for receiving the response of the laser.

The interface unit 15 recognises the message, activates one of its digital outputs controlling the feed displacement of the slide, for example by means of an electrovalve, and transmits to the NC 7 a confirmation pulse signal ACK through the digital channel 20.

The NC 7 receives the pulse signal and consequently takes note of the correct performance of the instructions included in the transmitted message. Then, the NC 7 sends a new message including a request for checking a logic condition corresponding to a particular situation (for example "reaching of the end stop position of the slide") and performs a displacement/measuring instruction for receiving the response of the interface unit 15.

The interface unit 15 recognises the message, and as a consequence there are performed logic equations in the processing unit 22 until a value "TRUE" (i.e. the slide reaches the end stop position) is generated. At this point, a confirmation signal ACK is sent through the digital channel 20.

If the NC 7 does not receive the confirmation signal ACK within a suitable elapse of time (equal to the time interval $t_F$-$t_I$ that is necessary to perform the whole path required by the displacement/measuring instruction I), it understands that the required displacement has not been correctly performed, and thus activates consequent actions, such as repeating the request or interrupting the cycle by sending an alarm message. Likewise, it is possible to proceed in connection with the retraction displacement of the slide.

In practice, there can be used in the machine tool an external device (in the herein described example, the sensor device 9 with the interface unit 15) without expressly involving the PLC, i.e. without there being the need of implementing physical connections with the latter, and of adding equations to the already existing program. In many cases it is sufficient, as previously disclosed, to connect the NC 7 to such external device by means of a one-way serial connection, and the messages can be completely managed by the application programs, that can be easily modified, of the NC 7.

Control systems and methods according to the present invention can include alternative embodiments with respect to what has been herein so far described and illustrated in the figures.

In particular, the selection means, shown in simplified form in FIG. 1 and indicated with reference number 24, and the associated blocks 26 and 28 for enabling/disabling the measuring signals and response signals can be implemented in different methods, per se known, by means of instructions of the processing unit 22 and/or circuit means.

As already stated, the request/instruction messages transmitted from the NC 7 to the interface unit 15 can be of various nature, and are not limited to the kind of messages which has been herein mentioned just as an example. Generally, such messages can have a varying complexity degree, and enable the interface unit 15 to interact with the control unit 7 by transmitting simple pulse signals through the channel 20 which is the same channel as the one used for transmitting the measuring signals.

In some cases, control units could enable to read the state of the measuring input without there being the need to perform a measuring instruction. However, even in these cases it is advantageous to use a control system according to the present invention, wherein measuring signals and simple confirmation signals can be alternatively transmitted through the same digital channel, from the interface unit of the sensor device to the control unit.

The invention claimed is:

1. A method for controlling a numerical control machine tool by means of a system with a sensor device, a control unit, an interface unit electrically connected to the sensor device and to the control unit, and a connection cable implementing a digital channel for electrical connection between the interface unit and the control unit, the control unit being adapted to control the performance of a measuring instruction and to detect a digital measuring signal consequently received within a determined time interval through said digital channel implemented by said connection cable, the performance of the measuring instruction including mutual displacements between the sensor device and at least one component part of the machine tool, wherein the control unit:
transmits a message to the interface unit through a communication channel different from said digital channel, and
controls the performance of a measuring instruction, including mutual displacements between the sensor device and said at least one component part of the machine tool;

wherein the interface unit:
receives said message,
performs operations consequent to the contents of the message, and
generates and transmits a digital confirmation signal through said digital channel implemented by said connection cable; and wherein the control unit:
detects that the digital confirmation signal is received within said determined time interval through said digital channel implemented by said connection cable, and wherein the sensor device is an optoelectronic apparatus which detects the interruption of a light beam and includes an emitter and a receiver of said light beam, wherein said message is a request for checking the efficiency of a measuring chain including the optoelectronic apparatus, the interface unit and the connection cable, and wherein said digital confirmation signal is indicative of the positive conclusion of said checking the efficiency of the measuring chain.

2. The method according to claim 1, wherein said digital confirmation signal is also indicative of the correct reception of the message.

3. The method according to claim 1, wherein the generation and the transmission of said digital measuring signal and digital confirmation signal are disabled and enabled in the interface unit, respectively, further to the reception of the message.

4. The method according to claim 1, wherein said checking the efficiency of the measuring chain includes the generation of a suitable sequence of power on and switch off controls to the emitter, and the concurrent observation of the state of the receiver.

5. The method according to claim 1, wherein the performance of the measuring instruction includes mutual displacements between the sensor device and a tool-holder of the machine tool.

6. The method according to claim 5, wherein said control unit, before controlling the performance of the measuring instruction, controls a displacement of the tool-holder to such a position that in the course of said mutual displacement included in the measuring instruction, the tool-holder, a tool connected to said tool-holder, or other movable component parts of the machine do not interfere with the light beam in a continuous way.

* * * * *